United States Patent
Zhang

(10) Patent No.: US 10,474,245 B2
(45) Date of Patent: Nov. 12, 2019

(54) INPUT METHOD AND ELECTRONIC DEVICE FOR IMPROVING CHARACTER RECOGNITION RATE

(71) Applicant: Lenovo (Beijing) Co., Ltd., Beijing (CN)

(72) Inventor: Yibing Zhang, Beijing (CN)

(73) Assignee: Lenovo (Beijing) Co., Ltd., Beijing (CN)

(*) Notice: Subject to any disclaimer, the term of this patent is extended or adjusted under 35 U.S.C. 154(b) by 32 days.

(21) Appl. No.: 14/640,040

(22) Filed: Mar. 6, 2015

(65) Prior Publication Data

US 2016/0091983 A1    Mar. 31, 2016

(30) Foreign Application Priority Data

Sep. 30, 2014    (CN) .......................... 2014 1 0521171

(51) Int. Cl.
 *G06F 3/023* (2006.01)
 *G06F 3/01* (2006.01)
 *G06K 9/00* (2006.01)
 *G06F 3/0488* (2013.01)

(52) U.S. Cl.
 CPC ............ *G06F 3/018* (2013.01); *G06F 3/0237* (2013.01); *G06F 3/04883* (2013.01); *G06K 9/00422* (2013.01)

(58) Field of Classification Search
 CPC .. G06F 3/018; G06F 3/0233; G06K 2209/011
 See application file for complete search history.

(56) References Cited

U.S. PATENT DOCUMENTS

| 5,119,296 A | * | 6/1992 | Zheng .................... G06F 3/018 715/263 |
| 7,443,386 B2 | | 10/2008 | Gao et al. |
| 2004/0153975 A1 | | 8/2004 | Williams et al. |
| 2006/0092128 A1 | | 5/2006 | Gao et al. |

(Continued)

FOREIGN PATENT DOCUMENTS

| CN | 1356616 A | 7/2002 |
| CN | 1782974 A | 6/2006 |
| CN | 102368235 A | 3/2012 |

OTHER PUBLICATIONS

First Chinese Office Action regarding Application No. 201410521171.9 dated Dec. 22, 2016. English translation provided by Unitalen Attorneys at Law.

*Primary Examiner* — Carolyn R Edwards
(74) *Attorney, Agent, or Firm* — Harness, Dickey & Pierce, P.L.C.

(57) ABSTRACT

An input method and an electronic device are provided. The input method includes: detecting a presence of a first track set which corresponds to a first predetermined identifier, wherein the first track set comprises at least one track and is inputted into the electronic device; and if the first track set corresponds to the first predetermined identifier, associating a second track set with at least one second predetermined character that is related to the first predetermined identifier, wherein the second track set comprises at least one second track and is inputted into the electronic device after the first track set has been inputted. Recognition ability of the electronic device for the character is improved, and the input efficiency is increased.

18 Claims, 4 Drawing Sheets

101 a presence of a first track set which corresponds to a first predetermined identifier is detected

102 if the first track set corresponds to the first predetermined identifier, a second track set is associated with at least one second predetermined character that is related to the first predetermined identifier

(56) References Cited

U.S. PATENT DOCUMENTS

| | | | |
|---|---|---|---|
| 2007/0040707 A1* | 2/2007 | Lai | G06F 3/018 |
| | | | 341/28 |
| 2007/0050186 A1* | 3/2007 | Cheng | G06F 17/2223 |
| | | | 704/9 |
| 2009/0073137 A1 | 3/2009 | Gao et al. | |
| 2011/0063225 A1* | 3/2011 | Michon | G06F 3/0219 |
| | | | 345/169 |
| 2014/0160032 A1* | 6/2014 | Che | G06F 3/04886 |
| | | | 345/173 |
| 2014/0327622 A1* | 11/2014 | Ouyang | G06F 3/04897 |
| | | | 345/169 |

* cited by examiner

INPUT METHOD AND ELECTRONIC DEVICE FOR IMPROVING CHARACTER RECOGNITION RATE

CROSS REFERENCES OF RELATED APPLICATIONS

The present application claims the priority to Chinese Patent Application No. 201410521171.9, entitled "INPUT METHOD AND ELECTRONIC DEVICE", filed on Sep. 30, 2014 with the State Intellectual Property Office of People's Republic of China, which is incorporated herein by reference in its entirety.

FIELD

The present disclosure relates to input technology, and in particular to an input method and an electronic device.

BACKGROUND

With development of science and technology, conventional electronic devices may be mainly classified into keyboard input electronic devices and handwriting input electronic devices in terms of input manner. The keyboard input electronic device relies on knowledge reverses of the person performing the input. For example, to input a certain Chinese character, the person performing the input needs to know pronunciation of the character and exactly know correct phonetic transcription of the character, causing inconvenience to older users having less knowledge reverse. For the handwriting input electronic device, the above problem does not exist, and a character is input conveniently as long as the user knows the writing of the character. However, the handwriting input electronic device has low recognition rate for input characters such as comma or period and turns to a database of the device to select all characters similar to the collected input track as candidate characters, resulting in a larger range of candidate characters for inputting and thus lower input efficiency.

SUMMARY

In view this, an input method and an electronic device are provided according to embodiments of the disclosure, for improving recognition rate of the electronic device for an input character, reducing a range of candidate characters, and improving input efficiency.

Accordingly, following technical solutions are provided in the embodiments of the disclosure.

An input method applicable to an electronic device is provided, which includes:

detecting a presence of a first track set which corresponds to a first predetermined identifier, where the first track set includes at least one track and is inputted into the electronic device; and if the first track set corresponds to the first predetermined identifier, associating a second track set with at least one second predetermined character that is related to the first predetermined identifier, where the second track set includes at least one second track and is inputted into the electronic device after the first track set has been inputted.

In an embodiment, the first predetermined identifier includes n characters, and detecting the presence of the first track set which corresponds to the first predetermined identifier includes determining among the n characters a character which corresponds to the first track set; and the at least one second predetermined character includes m characters, and associating the second track set with the second predetermined characters includes determining among the m characters a character that is associated with the second track set, where the m characters are contained in the n characters.

In an embodiment, associating the second track set with the at least one second predetermined character may include:

determining a character type corresponding to the first predetermined identifier.

In an embodiment, associating the second track set with the at least one second predetermined character may include:

associating the second track set with the at least one second predetermined character according to a first position relation based on a position of the second track of the second track set with a corresponding position of the first track of the first track set.

In an embodiment, if the first track set corresponds to the first predetermined identifier, only the at least one second predetermined character that is associated with the second track set is displayed and the first predetermined identifier that is associated with the first track set is not displayed.

In an embodiment, a candidate character of the first predetermined identifier associated with the first track set is displayed if the first track set corresponds to the first predetermined identifier.

In an embodiment, the detecting of the first track set is based on a preset condition, the preset condition being that the first predetermined identifier corresponding to the first track set is a preset identifier character, or that the first predetermined identifier corresponding to the first track set has a parameter satisfying a predetermined condition.

An electronic device is provided, which includes:

an input device;

a processor configured:

to detect a presence of a first track set which corresponds to a first predetermined identifier, where the first track set includes at least one first track and is inputted into the input device;

to associate a second track set with at least one second predetermined character that is related to the first predetermined identifier, where the second track set includes at least one second track and is inputted into the input device after the first track set has been inputted.

In an embodiment, the processor is configured:

to determine whether a character in the first predetermined identifier corresponding to the first track set satisfies a preset condition; and if so, to associate the second track set with the at least one second predetermined character.

In an embodiment, the processor is configured:

to determine a character type corresponding to the first predetermined identifier that is corresponds to the first track set; and to determine the at least one second predetermined character according to the determined character type.

In an embodiment, the processor is configured:

to determine a first position relation between a position of the first track of the first track set and a corresponding position of the second track of the second track set; and to associate the second track set with the at least one second predetermined character according to the first position relation.

BRIEF DESCRIPTION OF THE DRAWINGS

In order to illustrate the technical solutions in the embodiments of the present disclosure or in the conventional art more clearly, drawings to be used in the description of the conventional art or the embodiments will be described briefly hereinafter. Apparently, the drawings described hereinafter are only some embodiments of the present disclosure, and other drawings may be obtained by those skilled in the art according to those drawings without creative labor.

DETAILED DESCRIPTION

Figure 1A:
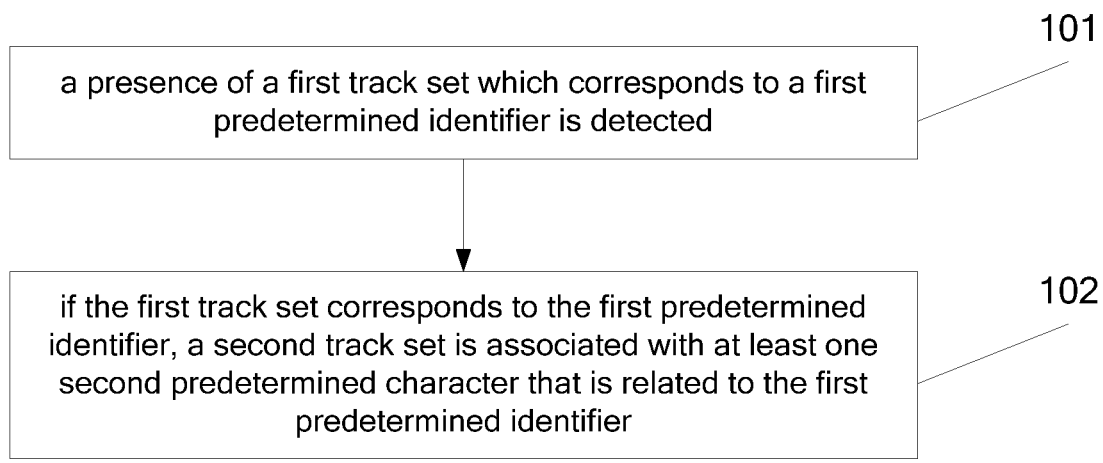
FIG. 1A is a schematic flowchart of an input method according to an embodiment of the disclosure.

As described in BACKGROUND, in the conventional electronic device, recognition rate for an input character is lower, resulting in a large range of candidate characters for inputting and thus low input efficiency.

As found by the inventor in research, in a case that a user inputs a character into an electronic device in a handwriting input mode, the character is generally not be written in a normal font with strict writing strokes, but is written randomly to a certain extent; the stroke of a punctuation mark is simple, and the random writing of the user for the punctuation mark has more significant effect, resulting in difficulty for the conventional electronic device to accurately recognize whether the input character is a punctuation mark or a simple character. For example, to write a comma, the user may draw a leftfalling stroke in an input interface of the electronic device randomly, and then the electronic device cannot accurately recognize whether the input from the user is a comma or a leftfalling stroke but can only select all the characters in a database of the electronic device that are similar to this input track as candidate characters, resulting in a large range of candidate characters for inputting and thus lower input efficiency.

In view of this, an input method applicable to an electronic device is provided in an embodiment of the disclosure, the method includes:

detecting a presence of a first track set which corresponds to a first predetermined identifier, where the first track set includes at least one track and is inputted into the electronic device; and if the first track set corresponds to the first predetermined identifier, associating a second track set with at least one second predetermined character that is related to the first predetermined identifier, where the second track set includes at least one second track and is inputted into the electronic device after the first track set has been inputted.

Accordingly, an electronic device is further provided according to an embodiment of the disclosure, which includes:

an input device;
a processor configured:
to detect a presence of a first track set which corresponds to a first predetermined identifier, where the first track set includes at least one first track and is inputted into the input device;
to associate a second track set with at least one second predetermined character that is related to the first predetermined identifier,
where the second track set includes at least one second track and is inputted into the input device after the first track set has been inputted.

As can be seen, with the input method according to the embodiment of the disclosure, for the input of a character corresponding to the second track set, a first track set may be input in advance, and in a case that the first track set corresponds to the first predetermined identifier, the second track set is only associated with at least one second predetermined character that is related to the first predetermined identifier, thus the recognition ability of the electronic device for the character corresponding to the second track set is improved, the range of candidate characters corresponding to the second track set is reduced, and the input efficiency is increased.

To make the above objects, features and advantages of the present disclosure more obvious and easy to be understood, particular embodiments of the present disclosure will be illustrated in detail in conjunction with the drawings hereinafter.

To facilitate the sufficient understanding of the disclosure, many details are set forth in the following description. However, the present disclosure can be implemented in other manners than those described herein, and similar extensions can be made by those skilled in the art without deviating from the spirit of the present disclosure. Therefore the present disclosure is not limited to the embodiments disclosed hereinafter.

An input method applicable to an electronic device is provided according to an embodiment of the disclosure. The electronic device includes an input device for collecting track set inputted by a user, a processor, and a display device for displaying a character corresponding to or associated with the track set.

As shown in FIG. 1A, the input method of the electronic device includes the steps 101-102.

In step 101, a presence of a first track set which corresponds to a first predetermined identifier is detected, where the first track set includes at least one track and is inputted into the electronic device.

In an example, the first predetermined identifier includes n characters. In this case, the step 101 may further includes determining among the n characters a character which corresponds to the first track set.

In step 102, if the first track set corresponds to the first predetermined identifier, a second track set is associated with at least one second predetermined character that is related to the first predetermined identifier. The second track set includes at least one second track and is inputted into the electronic device after the first track set has been inputted.

In an example, the at least one second predetermined character may comprise m characters, and the step 102 may further include determining among the m characters a character that is associated with the second track set, where the m characters are contained in the n characters.

In an exemplary embodiment, the at least one second predetermined character is related to the first predetermined identifier in a way such as: the first predetermined identifier identifying a character type corresponding to the character type of at least one second predetermined character.

As an example, if the numeric characters are identified with the character "*" in the electronic device, the first predetermined identifier "*" identifies that the character type of at least one second predetermined character is numeric character. As another example, if punctuation mark characters are identified with an identifier "&", the presence of the first track set which corresponds to a first predetermined identifier "&" may indicate that the second track set may be associated with at least one punctuation mark character.

In this case, associating the second track set with the at least one second predetermined character includes determining a character type identified by the first predetermined identifier, and associating the second track set with at least one second predetermined character that has a character type identified by the first predetermined identifier.

In another exemplary embodiment, the at least one second predetermined character is related to the first predetermined identifier in a way such as: the first predetermined identifier serving as a reference for associating the second track set with at least one second predetermined character. In this case, associating the second track set with the at least one second predetermined character may include:

associating the second track set with the at least one second predetermined character according to a first position relation based on a position of the second track of the second track set with a corresponding position of the first track of the first track set.

In an example, if it is detected that the first track set corresponds to the first predetermined identifier and the second track set is higher than the first track set, then the second track set is associated with a predetermined character; while if the second track set is lower than the first track set, then the second track set is associated with another predetermined character. For example, if the second track set is higher than the first track set "-", the second track set is associated with ")" but not ","; and if the second track set is lower than the first track set "-", then the second track set is associated with "," but not ")".

In another exemplary embodiment, the detecting of the first track set is based on a preset condition. For example, the preset condition may be that the first predetermined identifier corresponding to the first track set is a preset identifier character, or that the first predetermined identifier corresponding to the first track set has a parameter satisfying a predetermined condition.

According to an embodiment of the disclosure, after the first track set is collected, the first track set is recognized; if the recognition result of the first track set indicates that a preset condition is met, for example, the first track set corresponds to a preset identifier character or the first predetermined identifier corresponding to the first track set has a parameter satisfying a predetermined condition, then the second track set is collected and associated with at least one second predetermined character that is related to the first predetermined identifier, and in this case the first predetermined identifier is not displayed by the electronic device as an input character. If the preset condition is not met, which indicates that the first track set is just inputted into the electronic device as common input, then the character corresponds to the first track set is recognized and displayed, and the track set collected after the first track set will be associated with not only the character that is related to the first predetermined identifier, but also other characters that is irrelevant to the first predetermined identifier.

An input method applicable to an electronic device is provided according to an embodiment of the disclosure. The electronic device includes at least an input area and a display area. The input area is provided to collect an input track, such as a first track set and/or a second track set. The display area is provided to display a character corresponding to the input track, i.e., a candidate character corresponding to the first track set and/or the second track set.

Figure 1B:
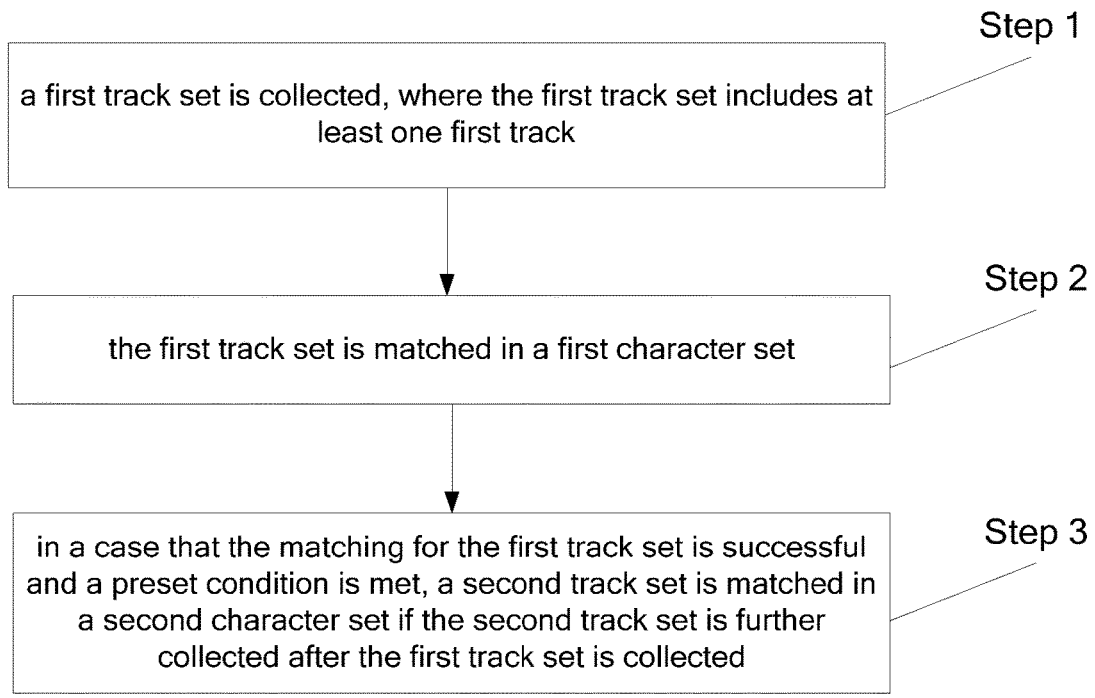
FIG. 1B is a schematic flowchart of an input method according to another embodiment of the disclosure.

As shown in FIG. 1B, the input method according to an embodiment of the disclosure includes the following steps 1 to 3.

In step 1, a first track set is collected, where the first track set includes at least one first track.

It is to be noted, in an embodiment of the disclosure, the first track set may include only one first track, or may include multiple first tracks, which is not limited in the disclosure and is adaptable as appropriate, as long as the first track set includes at least one first track.

It is further to be noted, in a case that the first track set includes multiple first tracks, a time interval between adjacent first tracks needs to be shorter than a first preset time, and/or a distance between adjacent first tracks needs to be shorter than a first preset distance. That is to say, if and only if the time interval between adjacent input tracks is shorter than the first preset time and/or the distance between adjacent input tracks is shorter than the first preset distance, the adjacent input tracks belong to the same track set; and if the time interval between adjacent input tracks is not shorter than the first preset time and the distance between adjacent input tracks is not shorter than the first preset distance, the adjacent input tracks belong to different track sets. The first preset time and the first preset distance depends on the responding capability of the electronic device, which are not limited in the disclosure and are adaptable as appropriate. In an embodiment, within the responding capability of the electronic device, shorter first preset time is better, and shorter first preset distance is better.

In step 2, the first track set is matched in a first character set.

After the first track set is collected, the first track set is matched in a first character set. That is to say, the first track set is compared with characters in the first character set one by one, to select a candidate character corresponding to the first track set. It is to be noted, in an embodiment of the disclosure, the first character set may be a set consisting of all characters in the electronic device, or may be a set consisting of some specific characters in the electronic device, which is not limited in the disclosure and is adaptable as appropriate.

In step 3, in a case that the matching for the first track set is successful and a preset condition is met, a second track set is matched in a second character set if the second track set is further collected after the first track set is collected. The second track set includes at least one second track, and the first character set is different from the second character set.

In a case that the matching for the first track set is successful and the preset condition is met, i.e., there is a character in the first character set matching with the first track set and the character in the first character set matching with the first track set meets the preset condition, and if the second track set is collected after the first track set is collected, the second track set is matched in the second character set.

In an embodiment of the disclosure, the first character set is a set consisting of all the characters in the electronic device, and the first character set includes the second character set, i.e., all the characters in the second character set belong to the first character set. In an embodiment of the disclosure, the first character set includes n characters, and the matching the first track set in the first character set includes determining among the n characters a character matching with the first track set; and the second character set includes m characters, and the matching the second track set in the second character set includes determining among the m characters a character matching with the second track set; where the m characters are contained in the n characters.

In a preferred embodiment of the disclosure, the first character set is a set consisting of all the characters in the electronic device, including a numeric character set, a Chinese character set, a punctuation mark character set, an English letter set and the like, and the second character set is a punctuation mark character set. In another embodiment of the disclosure, the second character set may be a numeric character set, an English letter set or the like, which is not limited in the disclosure, as long as the first character set includes the second character set, i.e., all the characters in the second character set belong to a character set included in the first character set.

In another embodiment of the disclosure, the first character set is a set consisting of some of the characters in the electronic device, the first character set and the second character set are two parallel character sets, i.e., none of the characters in the first character set is the same as any one of the characters in the second character set. In a preferred embodiment of the disclosure, the first character set is an identifier character set in the electronic device, the second character set may be a punctuation mark character set, a numeric character set or an English letter set, and each identifier character in the first character set identifies one character type corresponding to the character type of the character in the second character set.

As an example, if the numeric characters are identified with the character "*" in the electronic device, the first character set includes only one character "*", and the second character set is the numeric character set. As another example, if numeric characters are identified with a character "*", punctuation mark characters are identified with a character "&", and English letters are identified with a character "#" in the electronic device, the first character set includes three character: the character "*", the character "&" and the character "#", and the second character set includes three character subsets: the numeric character set, the punctuation mark character set and the English letter set, which correspond the identifier characters in the first character set respectively. In another embodiment of the disclosure, the first character set may include other identifier characters, and the second character set may include other character sets, which is not limited in the disclosure, as long as the identifier characters in the first character set are in one-to-one correspondence to the character subsets in the second character set.

In another embodiment of the disclosure, the first character set is a set consisting of some of the characters in the electronic device, and the first character set and the second character set are not two parallel character sets but two character sets having some common characters and some distinct characters, i.e., the first character set and the second character set have an intersection set, which is not limited in the disclosure and is adaptable as appropriate.

It is to be noted, in a case that the first character set is a set consisting of some of the characters in the electronic device, the character in the first character set may be a self-defined character or an existing character, and the self-defined character or uncommon character is preferable, which is not limited in the disclosure and is adaptable as appropriate.

On the basis of any one of the above embodiments, in an embodiment of the disclosure, the character corresponding to the first track set is used to represent the type of the character corresponding to the second track set. In this embodiment, the matching the second track set in the second character set includes: determining a character type corresponding to a character in the first character set matching with the first track set; determining the second character set according to the determined character type; and matching the second track set in the determined second character set.

In an embodiment of the disclosure, the character corresponding to "num" in the first track set is used to identify numerals, and if "num 0" is collected, the electronic device may accurately determine that the character corresponding to "num 0" is the numeral "0", but not the letter "O" or "o", thereby reducing the range of candidate characters for the second track set, and improving the input efficiency. In another embodiment of the disclosure, "★" in the first track set is used to identify English letters, and if "★0" is collected, the electronic device may accurately determine that the character corresponding to "★0" is the letter "O", but not the numeral "0", thereby reducing the range of candidate characters for the second track set, and improving the input efficiency. In another embodiment of the disclosure, the character corresponding to "dot" is used to identify punctuation marks, and if "dot," is collected, the electronic device may accurately determine that the character corresponding to "dot," is the punctuation mark ",", but not a leftfalling stroke in a Chinese character, which is not limited in the disclosure and may be set according to the usage requirement of the electronic device.

In another embodiment of the disclosure, the character corresponding to the first track set serves as a reference for recognizing the character corresponding to the second track set. In this embodiment, the matching the second track set in the second character set includes matching the second track set in the second character set according to a first position relation between the first track set and the second track set, where the character in the second character set matching with the second track set and the character in the first character set matching with the first track set have the first position relation. That is to say, the second track set is matched with the characters in the second character set to select characters matching with the second track set as a first candidate character set from the second character set, and based on the first position relation between the second track set and the first track set, characters having the first position relation with the character corresponding to the first track set are selected from the first candidate character set as a second candidate character set, where the second candidate character set is taken as the range of candidate characters for the second track set. Alternatively, based on the first position relation between the second track set and the first track set, a first candidate character set is selected from the second character set, where each character in the first candidate character set and the character corresponding to the first track set have the first position relation, and then the second track set is compared with each of the characters in the first candidate character set, to select characters matching with the second track set from the first candidate character set as a second candidate character set, where the second candidate character set is taken as the range of candidate characters for the second track set.

In an embodiment of the disclosure, the first position relation between the first track set and the second track set is determined by the relative up-down position of the first track set and the position of the second track set. In an embodiment of the disclosure, the first track set includes a first track portion as a reference. For example, if the first track set is "−", the first track portion of the first track set is the whole track in the set, and if the first track is "+", the first track portion of the first track set is the track at the center of "+". In another embodiment of the disclosure, the first track set may be other tracks, which is not limited in the disclosure and is adaptable as appropriate, and the first track portion of the first track set is preferably the track at the center of the first track set.

In an embodiment of the disclosure, the character corresponding to "−" in the first track set is used as a reference for the recognition. For example, ")" and "," may be recognized based on the relative position relation between the second track set and "−", i.e., whether the second track set is higher or lower than the first track set "−". If the second track set is higher than the first track set "−", the character corresponding to the second track set is ")" but not ","; and if the second track set is lower than the first track set "−", the character corresponding to the second track set is "," but not ")". The upper-case letter "O" and the lower-case letter "o" may be also recognized based on the relative position relation between the second track set and "−", i.e., whether the second track set is higher than the first track set "−" or not. If the second track set is higher than the first track set "−", the character corresponding to the second track set is "O" but not "o"; and if the second track set is not higher than the first track set "−", the character corresponding to the second track set is "o" but not "O". Therefore, the recognition ability of the electronic device is improved, and the input efficiency is increased.

In another embodiment of the disclosure, the first position relation between the first track set and the second track set is determined by a relative inside-outside position relation between the first track set and the second track set. In this embodiment, the first track is a closed or approximately closed track, and accordingly the first track set embraces a closed or approximately closed region, such as "□", "✩" or other closed or approximately closed tracks; and the second track set is compared with edges of the region embraced by the first track set. If the second track set is completely located within the region embraced by the first track set, the second track set corresponds to a character, and if the second track set includes a track beyond the region embraced by the first track set, the second track set corresponds to another character.

In an embodiment of the disclosure, the first track set uses the character corresponding to "✩" as a reference for recognition. If the second track set is completely located within the closed region embraced by the first track set, the second track set corresponds to a character, and if the second track set is not completely located within the closed region embraced by the first track set, the second track set corresponds to another character. For example, to recognize "X" and "x", if the second track set is completely located within the closed region embraced by the first track set, i.e., the position relation between the first track set and the second track set is as ✩, the character corresponding to the second track set is lower-case letter "x", and if the second track set is not completely located within the closed region embraced by the first track set, i.e., the position relation between the first track set and the second track set is as X, the character corresponding to the second track set is the upper-case letter "X". In another embodiment of the disclosure, other position relations may be used as the reference for recognition, which is not limited in the disclosure and is adaptable as appropriate.

On the basis of any one of the above embodiments, in an embodiment of the disclosure, in a case that the matching for the first track set is successful and a preset condition is met, and if the second track set is further collected after the first track set is collected, the electronic device automatically omits the character corresponding to the first track set for the displaying, displays only the candidate character in the second character set matching with the second track set but does not display the candidate character in the first character set matching with the first track set. In a case that the matching for the first track set is successful and the preset condition is met, and if the second track set is not collected within a second preset time duration after the first track set is collected, the electronic device does not display any character, and collects the first track set again. In a case that the matching for the first track set is successful and the preset condition is not met, the character corresponding to the first track set is a character to be input but not the identifier character, and the electronic device displays the candidate character in the first character set matching with the first track set.

For example, in a case that the character corresponding to "dot" is used to identify the punctuation marks in the electronic device, and if the track set collected by the electronic device is "dot,", the first track set is matched successfully, and the preset condition is met (i.e., the character corresponding to the first track set corresponds to the preset identifier character "dot"), the electronic device displays only the character corresponding to the second track set ",", but does not display the character corresponding to the first track set "dot", i.e., the electronic device displays only ",". If the track set collected by the electronic device is "dot,", the first track set is matched successfully, and the preset condition is met, but the second track set is not collected by the electronic device within a second preset time duration after the first track set is collected, the electronic device does not display any character. If the track set collected by the electronic device is "dot,", i.e., the first track set is "doc" and is successfully matched in the first character set, but the character corresponding to the first track set does not match with the character corresponding to the preset track set "dot", at this time the first track set is successfully matched but the preset condition is not met (i.e., the character corresponding to the first track set does not match with the preset identifier character "dot"), the electronic device displays the candidate character corresponding to the first track set "doc".

It is to be noted, in any one of the above embodiments of the disclosure, the input area of the electronic device is provided to collect the input track, i.e., the first track set and/or the second track set, and the display area of the electronic device is provided to display the character corresponding to the input track, i.e., the candidate character corresponding to the first track set and/or the candidate character corresponding to the second track set. In an embodiment, in an embodiment of the disclosure, the display area of the electronic device includes a candidate display area and an output display area. If there is only one candidate character corresponding to the input track collected in the input area of the electronic device, this candidate character is directly displayed in the output display area. If there are multiple candidate characters corresponding to the input track collected in the input area of the electronic device, these candidate characters are displayed in the candidate display area, and the candidate character finally determined by active selection of the user from these candidate characters is displayed in the output display area of the electronic device.

It is further to be noted that, in any one of the above embodiments of the disclosure, the preset condition may be that the character in the first character set matching with the first track set is a preset identifier character, such as "dot", "★" or other self-defined characters, or that the character in the first character set matching with the first track set has a parameter meeting a predetermined condition, such as a character having a length beyond a certain value ""_____"", or a character having a size beyond a certain value "A", which is not limited in the disclosure and is adaptable as appropriate.

To sum up, with the input method according to the embodiment of the disclosure, for the input of the character corresponding to the second track set, if there is a character confusable with the character corresponding to the second track set, or there are too many candidate characters in the electronic device matching with the second track set to be input, the first track set may be input in the input area of the electronic device before the second track set is input. If the first track set is successfully matched with the first character set, and the character in the first character set matching with the first track set is the preset identifier character, it is only needed to match the second track set in the second character set corresponding to the identifier character matching with the first track set, rather than to match the second track set in the whole character set in the electronic device, thereby reducing the number of matching of the second track set, increasing the efficiency of matching of the second track set, improving the recognition ability of the electronic device for the character corresponding to the second track set, reducing the number of the candidate characters corresponding to the second track set, and improving the input efficiency.

Figure 2:
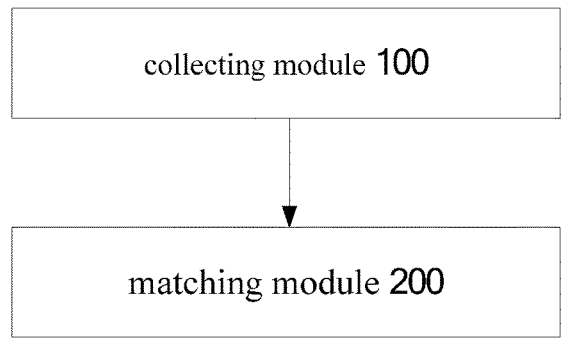
FIG. 2 is a schematic structural diagram of an electronic device according to an embodiment of the disclosure.

Accordingly, it is provided an electronic device in an embodiment of the disclosure, as shown in FIG. 2, which includes:

a collecting module 100, configured to collect a first track set, where the first track set includes at least one first track; and a matching module 200, configured to match the first track set in a first character set, and to match, in a case that the matching for the first track set is successful and a preset condition is met, a second track set in a second character set if the second track set is further received after the first track set is received, where the second track set includes at least one second track, and the first character set is different from the second character set. It should be appreciated that the collecting module 100 and the matching module 200 may be constituted in one or more processors.

In an embodiment of the disclosure, the electronic device includes an input area and a display area. The collecting module 100 collects the first track set and the second track set by collecting input tracks in the input area. The collecting module 100 outputs the first track set to the matching module 200 after collecting the first track set. The matching module 200 matches the received first track set in the first character set. In a case that the matching for the first track set is successful and a preset condition is met, and if the second track set is further received after the first track set is received, the matching module 200 matches the received second track set in the second character set, and then the candidate character in the second character set matching with the second track set is displayed in the display area.

Figure 3:
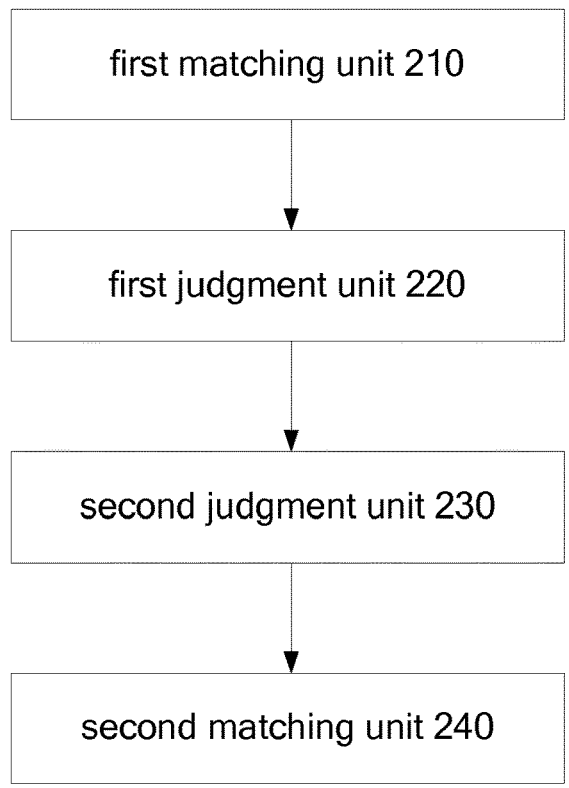
FIG. 3 is a schematic structural diagram of a matching module according to an embodiment of the disclosure.

On the basis of any one of the above embodiments, in an embodiment of the disclosure, as shown in FIG. 3, the matching module 200 includes:

a first matching unit 210, configured to match the first track set in the first character set;

a first judgment unit 220, configured to judge whether a character in the first character set matching with the first track set meets a preset condition;

a second judgment unit 230, configured to judge, in a case that the matching for the first track set is successful and the preset condition is met, whether the second track set is received after the first track set is received; and a second matching unit 240, configured to match the second track set in the second character set if the second track set is received after the first track set is received, where the second track set includes at least one second track.

In a case that the matching for the first track set is successful and the preset condition is met, and if the second track set is further received after the first track set is received, the electronic device displays only the candidate character in the second character set matching with the second track set, and does not display the candidate character in the first character set matching with the first track set. In a case that the matching for the first track set is successful and the preset condition is met, and if the second track set is not collected within a preset time duration after the first track set is collected, the electronic device does not display any character, and collects the first track set again. In a case that the matching for the first track set is successful and the preset condition is not met, the electronic device displays directly the candidate character in the first character set matching with the first track set.

It is further to be noted that, in an embodiment of the disclosure, the display area includes an output display area and a candidate display area. If there is only one candidate character in the second character set matching with the second track set, this candidate character is directly displayed in the output display area. If there are multiple candidate characters in the second character set matching with the second track set, these candidate characters are displayed in the candidate display area, and the candidate character finally determined by active selection of the user from these candidate characters is displayed in the output display area.

Figure 4:
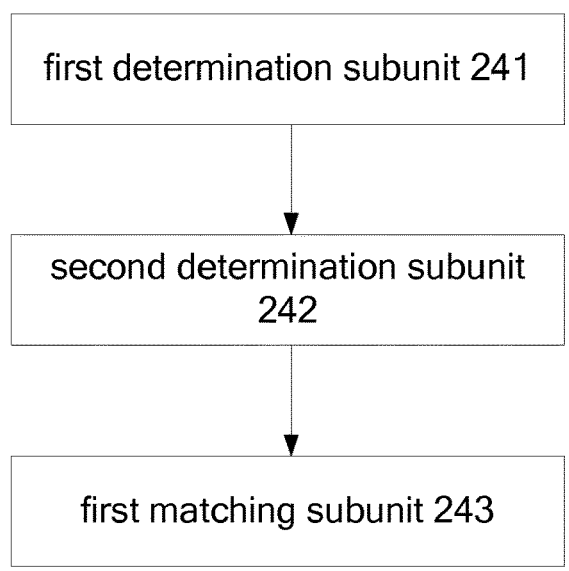
FIG. 4 is a schematic structural diagram of a second matching unit according to an embodiment of the disclosure.

On the basis of any one of the above embodiments, in an embodiment of the disclosure, as shown in FIG. 4, the character corresponding to the first track set is used to represent the type of the character corresponding to the second track set. In this embodiment, the second matching unit 240 includes:

a first determination subunit 241, configured to determine a character type corresponding to a character in the first character set matching with the first track set;

a second determination subunit 242, configured to determine the second character set according to the determined character type; and a first matching subunit 243, configured to match the second track set in the determined second character set.

In an embodiment of the disclosure, the character corresponding to "num" in the first track set is used to identify numerals, and if "num 0" is collected, it may be determined via the first determination subunit based on the character in the first character set corresponding to "num" that the character type corresponding to "num" is numeral, then the second character set may be determined by the second determination subunit according to the character type corresponding to "num", and the second track set "0" is matched in the determined second character set by the first matching subunit, so that the electronic device may accurately determine that the character corresponding to "num 0" is the numeral "0", but not the letter "O" or "o", thereby reducing the range of candidate characters for the second track set, and improving the input efficiency. In another embodiment of the disclosure, in the first track set, the character corresponding to "dot" may be used to identify punctuation marks, "★" may be used to identify English letters, and the like, which is not limited in the disclosure and is adaptable as appropriate.

Figure 5:
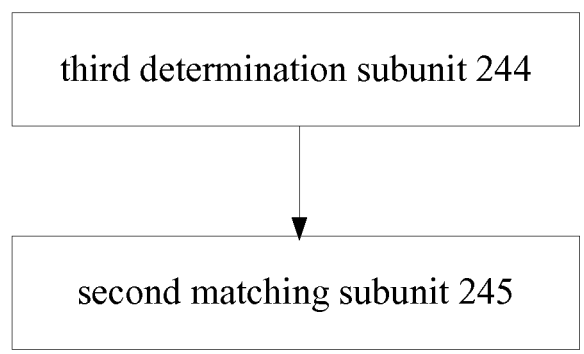
FIG. 5 is a schematic structural diagram of a second matching unit according to another embodiment of the disclosure.

In another embodiment of the disclosure, the character corresponding to the first track set serves as a reference for recognizing the character corresponding to the second track set. In this embodiment, as shown in FIG. 5, the second matching unit 240 includes:

a third determination subunit 244, configured to determine a first position relation between the first track set and the second track set; and a second matching subunit 245, configured to match the second track set in the second character set according to the first position relation between the first track set and the second track set, where the character in the second character set matching with the second track set and the character in the first character set matching with the first track set have the first position relation.

In an embodiment of the disclosure, the character corresponding to "-" in the first track set is used as a reference for recognition. For example, for the recognition of ")" and ",", the relative position relation of ")", "," and "-" are determined by the third determination subunit, and the first position relation between the first track set and the second track set is obtained. It is determined, by the second matching subunit according to the first position relation between the first track set and the second track set, whether the second track set is "-)" or "-,", and the second track set is matched in the corresponding second character set, thereby improving the recognition ability of the electronic device, and increasing the input efficiency. In another embodiment of the disclosure, for the recognition of the upper-case letter "O" and the lower-case letter "o", whether the second track set is "-O" or "-o" may be determined based on the relative position relation between the second track set and "-", thereby improving the recognition ability of the electronic device, and increasing the input efficiency, which is not limited in the disclosure and is adaptable as appropriate.

It is to be noted that, in any one of the above embodiments of the disclosure, the preset condition may be that the character in the first character set matching with the first track set is a preset identifier character, such as "dot", "★" or other self-defined characters, or that the character in the first character set matching with the first track set has a parameter meeting a predetermined condition, such as a character having a length beyond a certain value "" ___ " ", or a character having a size beyond a certain value "A", which is not limited in the disclosure and is adaptable as appropriate.

Figure 6:
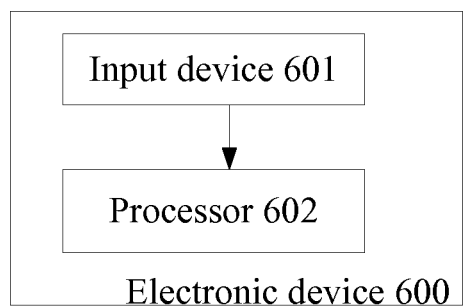
FIG. 6 is a schematic structural diagram of an electronic device according to an embodiment of the disclosure.

As shown in FIG. 6, an electronic device 600 is provided according to an embodiment of the disclosure. The electronic device 600 may include an input device 601 and a processor 602.

In an example, the processor 602 is configured:

to detect a presence of a first track set which corresponds to a first predetermined identifier, where the first track set includes at least one first track and is inputted into the input device;

to associate a second track set with at least one second predetermined character that is related to the first predetermined identifier, where the second track set includes at least one second track and is inputted into the input device after the first track set has been inputted.

In another example, the processor 602 is configured:

to determine whether a character in the first predetermined identifier corresponding to the first track set satisfies a preset condition; and if so, to associate the second track set with the at least one second predetermined character.

In yet another example, the processor 602 is configured:

to determine a character type corresponding to the first predetermined identifier that is corresponds to the first track set; and to determine the at least one second predetermined character according to the determined character type.

In another example, the processor 602 is configured:

to determine a first position relation between a position of the first track of the first track set and a corresponding position of the second track of the second track set; and to associate the second track set with the at least one second predetermined character according to the first position relation.

As can be seen, with the electronic device according to the embodiment of the disclosure, for the input of the character corresponding to the second track set, if there is a character confusable with the character corresponding to the second track set, or there are too many candidate characters in the electronic device matching with the second track set to be input, the first track set may be input in the input area of the electronic device before the second track set is input. If the first track set is successfully matched with the first character set, and the character in the first character set matching with the first track set is the preset identifier character, it is only needed to match the second track set in the second character set corresponding to the identifier character matching with the first track set, and rather than to match the second track set in the whole character set in the electronic device, thereby reducing the number of matching of the second track set, increasing the efficiency of matching of the second track set, improving the recognition ability of the electronic device for the character corresponding to the second track set, reducing the number of the candidate characters corresponding to the second track set, and improving the input efficiency.

In the present specification, the embodiments are described in progressive manner, each embodiment focuses on difference of this embodiment from other embodiments, and for similar parts, reference may be made to other embodiments.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. A handwriting input method of an electronic device, the electronic device comprising a processor operating in conjunction with a memory, the method comprising:
- detecting, by the processor, a presence of a first handwriting track set, wherein the first handwriting track set comprises at least one track and is inputted into the electronic device;
- determining, by the processor, whether the first handwriting track set matches a predetermined identifier in a first character set;
- in a case that the first handwriting track set does not match the predetermined identifier in the first character set:
  - displaying a first candidate character corresponding to the first handwriting track set in a candidate display area of the electronic device, wherein the first candidate character is characters in the first character set;
- in a case that the first handwriting track set matches the predetermined identifier in the first character set:
  - detecting, by the processor, a presence of a second handwriting track set, wherein the second handwriting track set is inputted into the electronic device;
  - determining, by the processor, a second character set according to the predetermined identifier, wherein the predetermined identifier is configured to indicate that the second character set is a numeric character set, a punctuation mark character set, or an English letter set;
  - matching, by the processor, the second handwriting track set in the second character set; and
  - displaying a second candidate character corresponding to the second handwriting track set in the candidate display area of the electronic device, wherein the second candidate character is characters in the second character set, wherein the second character set is a subset of the first character set.

2. An electronic device comprising:
- an input device;
- a processor configured to:
- detect, by the processor, a presence of a first handwriting track set, wherein the first handwriting track set comprises at least one track and is inputted into the electronic device;
- determine, by the processor, whether the first handwriting track set matches a predetermined identifier in a first character set;
- in a case that the first handwriting track set does not match the predetermined identifier in the first character set:
  - display a first candidate character corresponding to the first handwriting track set in a candidate display area of the electronic device, the first candidate character is characters in the first character set; and
- in a case that the first handwriting track set matches the predetermined identifier in the first character:
  - detect, by the processor, a presence of a second handwriting track set, wherein the second handwriting track set is inputted into the electronic device;
  - determine, by the processor, a second character set according to the predetermined identifier, wherein the predetermined identifier is configured to identify that the second character set is a numeric character set, a punctuation mark character set or an English letter set;
  - match, by the processor, the second handwriting track set in the second character set; and
  - display a second candidate character corresponding to the second handwriting track set in the candidate display area of the electronic device, the second candidate character is characters in the second character set, wherein the second character set is a subset of the first character set.

3. The handwriting input method according to claim 1, wherein the first character set comprises numeric characters, Chinese characters, punctuation mark characters, and English letters.

4. The handwriting input method according to claim 1, wherein, in a case that the first handwriting track set comprises a plurality of first tracks, an input time interval between adjacent first tracks is less than a first preset time or a distance between adjacent first tracks is less than a first preset distance.

5. The handwriting input method according to claim 1, wherein, in the case that the first handwriting track set matches the predetermined identifier in the first character set, the method further comprises:
- displaying the first candidate character corresponding to the first handwriting track set in the candidate display area of the electronic device in a case that the presence of the second handwriting track set is not detected within a second preset time duration after the first handwriting track set is detected.

6. The handwriting input method according to claim 1, wherein the predetermined identifier comprises a first predetermined identifier, a second predetermined identifier, and a third predetermined identifier, the first predetermined identifier indicates that the second character set is the numeric character set, the second predetermined identifier indicates that the second character set is the punctuation mark character set, and the third predetermined identifier indicates that the second character set is the English letter set.

7. The handwriting input method according to claim 1, wherein the second character is determined by comparing a positional relationship between the second handwriting track set and the first handwriting track set that corresponds to the predetermined identifier.

8. The handwriting input method according to claim 7, wherein the positional relationship is a relative up-down position relationship.

9. The handwriting input method according to claim 7, wherein the positional relationship is a relative inside-outside position relationship.

10. The handwriting input method according to claim 1, wherein, in a case that the second character set is the English letter set, an upper-case English letter and a lower-case English letter are distinguished by comparing a positional relationship between the second handwriting track set and the first handwriting track set that corresponds to the predetermined identifier.

11. The electronic device according to claim 2, wherein the first character set comprises numeric characters, Chinese characters, punctuation mark characters, and English letters.

12. The electronic device according to claim 2, wherein, in a case that the first handwriting track set comprises a plurality of first tracks, an input time interval between adjacent first tracks is less than a first preset time or a distance between adjacent first tracks is less than a first preset distance.

13. The electronic device according to claim 2, wherein, in the case that the first handwriting track set matches the predetermined identifier in the first character set, the processor is further configured to:

display the first candidate character corresponding to the first handwriting track set in the candidate display area of the electronic device in a case that the presence of the second handwriting track set is not detected within a second preset time duration after the first handwriting track set is detected.

14. The electronic device according to claim 2, wherein the predetermined identifier comprises a first predetermined identifier, a second predetermined identifier and a third predetermined identifier, the first predetermined identifier indicates that the second character set is the numeric character set, the second predetermined identifier indicates that the second character set is the punctuation mark character set, and the third predetermined identifier indicates that the second character set is the English letter set.

15. The electronic device according to claim 2, wherein the second character is determined by comparing a positional relationship between the second handwriting track set and the first handwriting track set that corresponds to the predetermined identifier.

16. The electronic device according to claim 15, wherein the positional relationship is a relative up-down position relationship.

17. The electronic device according to claim 15, wherein the positional relationship is a relative inside-outside position relationship.

18. The electronic device according to claim 1, wherein, in a case that the second character set is the English letter set, an upper-case English letter and a lower-case English letter are distinguished by comparing a positional relationship between the second handwriting track set and the first handwriting track set that corresponds to the predetermined identifier.

* * * * *